United States Patent
Kelsey et al.

(10) Patent No.: US 8,428,516 B2
(45) Date of Patent: Apr. 23, 2013

(54) WIRELESS AD HOC NETWORK SECURITY

(75) Inventors: Nicholas Kelsey, Sunnyvale, CA (US);
Christopher Waters, Los Altos, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

(21) Appl. No.: 13/429,110

(22) Filed: Mar. 23, 2012

(65) Prior Publication Data

US 2012/0240239 A1 Sep. 20, 2012

Related U.S. Application Data

(63) Continuation of application No. 13/010,436, filed on Jan. 20, 2011, now Pat. No. 8,145,131, which is a continuation of application No. 11/544,454, filed on Oct. 6, 2006, now Pat. No. 7,885,602.

(51) Int. Cl.
*H04B 7/00* (2006.01)

(52) U.S. Cl.
USPC ....... 455/41.2; 455/404.2; 455/410; 370/338; 380/201; 380/270; 713/151; 713/166

(58) Field of Classification Search ............... 455/41.2, 455/41.3, 404.2, 410, 411; 370/338; 380/201, 380/270; 713/151, 166, 168, 193
See application file for complete search history.

(56) References Cited

U.S. PATENT DOCUMENTS

| | | | |
|---|---|---|---|
| 7,289,790 B2 * | 10/2007 | McCorkle et al. | 455/411 |
| 7,436,833 B2 | 10/2008 | Jimmei | |
| 7,552,325 B2 | 6/2009 | Norton et al. | |
| 7,885,602 B1 | 2/2011 | Kelsey et al. | |
| 8,145,131 B2 | 3/2012 | Kelsey et al. | |
| 2004/0147223 A1 * | 7/2004 | Cho | 455/41.2 |
| 2004/0152417 A1 | 8/2004 | Kim et al. | |
| 2005/0245269 A1 | 11/2005 | Demirhan et al. | |
| 2006/0077957 A1 | 4/2006 | Reddy et al. | |
| 2006/0165073 A1 | 7/2006 | Gopinath et al. | |

OTHER PUBLICATIONS

U.S. Appl. No. 11/544,454, Non-Final Office Action, mailed Jul. 21, 2009.
U.S. Appl. No. 11/544,454, Non-Final Office Action, mailed Mar. 10, 2010.
U.S. Appl. No. 11/544,454, Notice of Allowance, mailed Sep. 30, 2010.
U.S. Appl. No. 13/010,436, Non-Final Office Action, mailed Apr. 21, 2011.
U.S. Appl. No. 13/010,436, Notice of Allowance, mailed Nov. 21, 2011.

* cited by examiner

*Primary Examiner* — Tuan H Nguyen
(74) *Attorney, Agent, or Firm* — Blakely, Sokoloff, Taylor & Zafman LLP

(57) ABSTRACT

Providing network security includes detecting network traffic associated with an ad hoc network that includes a first station and a second station, and preventing data sent by the first station from reaching the second station.

20 Claims, 5 Drawing Sheets

WIRELESS AD HOC NETWORK SECURITY

CROSS REFERENCE TO OTHER APPLICATIONS

This application is a Continuation of application Ser. No. 13/010,436 filed on Jan. 20, 2011 which is a Continuation of application Ser. No. 11/544,454, filed Oct. 6, 2006, now U.S. Pat. No. 7,885,602, the entire contents of which are incorporated herein by reference.

BACKGROUND OF THE INVENTION

The IEEE 802.11 wireless networking standard provides way for two or more wireless stations to communicate directly to each other without requiring additional infrastructure such as an access point. This method is formally specified as Independent Basic Service Set (IBSS), and is more commonly referred to as the "ad hoc mode" or the "ad hoc network". An ad hoc network is achieved when two or more stations have been configured with the same Service Set Identity (SSID) and are close enough to be able to communicate with each other over the wireless medium.

Although sometimes useful, ad hoc setups pose problems for network security enforcement. Currently, wireless network security is typically based around access points since they are manageable choke-points in the network infrastructure. Using an ad hoc configuration, however, stations can directly form a wireless network among themselves without going through an access point. Ad hoc networks often increase the overall network's security vulnerability because ad hoc networks are frequently configured by end users without using any authentication or encryption, thus can be easily exploited by hackers.

For example, it is possible for an employee of a company to intentionally configure an ad hoc network among several company laptops, or inadvertently enable the ad hoc configuration on one of the company computers. A hacker in the vicinity can detect the presence of the ad hoc network and establish a connection to it. If any of the company computers on the ad hoc network also has an active connection to the company's main network, the hacker could potentially gain access to the main corporate network once he is on the ad hoc network. It is often difficult to enforce security policy to prevent stations from communicating with each other via ad hoc networks since direct control over the stations is typically required to disable the ad hoc networks.

It would be useful, therefore, to have a way to detect and disable 802.11 ad hoc networks. It would also be desirable if the technique does not require direct control over the stations involved.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing network security is disclosed. The technique includes detecting network traffic associated with a wireless ad hoc network that includes a plurality of stations, and preventing data sent by one of the stations from reaching another station. In some embodiments, decoy information is sent to at least one of the stations to induce the station to behave incorrectly, thus preventing the ad hoc network from functioning properly. In various embodiments, the decoy information includes beacons, probe response packets, Transmission Control Protocol (TCP) information, Internet Protocol (IP) information, and/or other appropriate data.

Figure 1A:
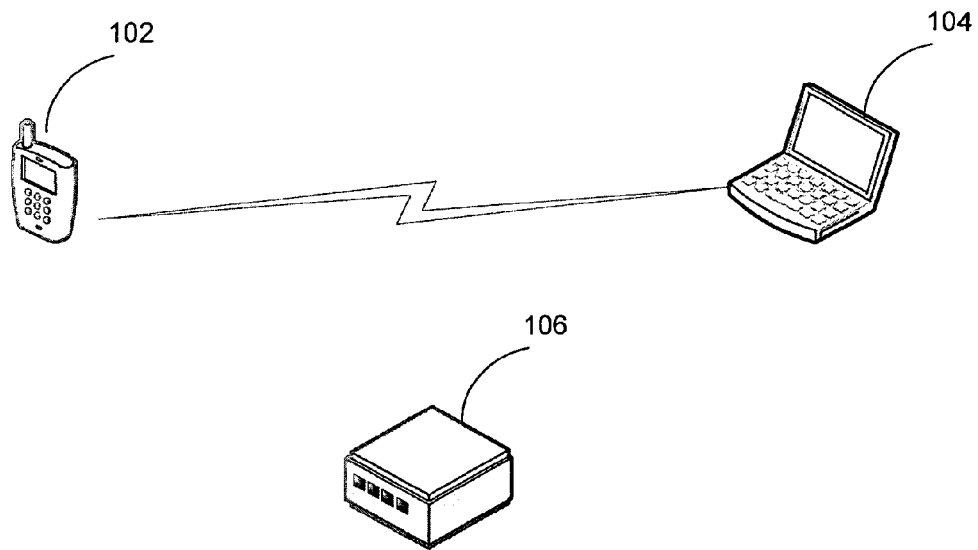
FIGS. 1A-1B are network diagrams illustrating an embodiment of a network.
Figure 1B:
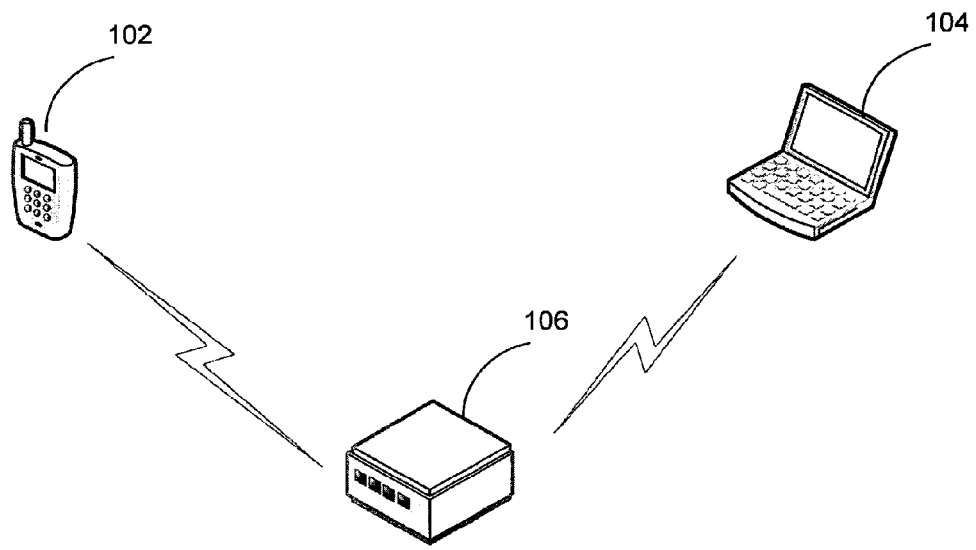

FIGS. 1A-1B are network diagrams illustrating an embodiment of a network. In FIG. 1A, network security system 106 is inactive, and stations 102 and 104 form an ad hoc network. The stations may be laptops, desktops, Personal Digital Assistants (PDAs), mobile handsets, or any other devices that support the IEEE 802.11 wireless standard. The network is formed when the users configure their respective stations by specifying the same SSID for the network. If the stations are located within the wireless transmission range, they will be able to communicate with each other.

Figure 2:
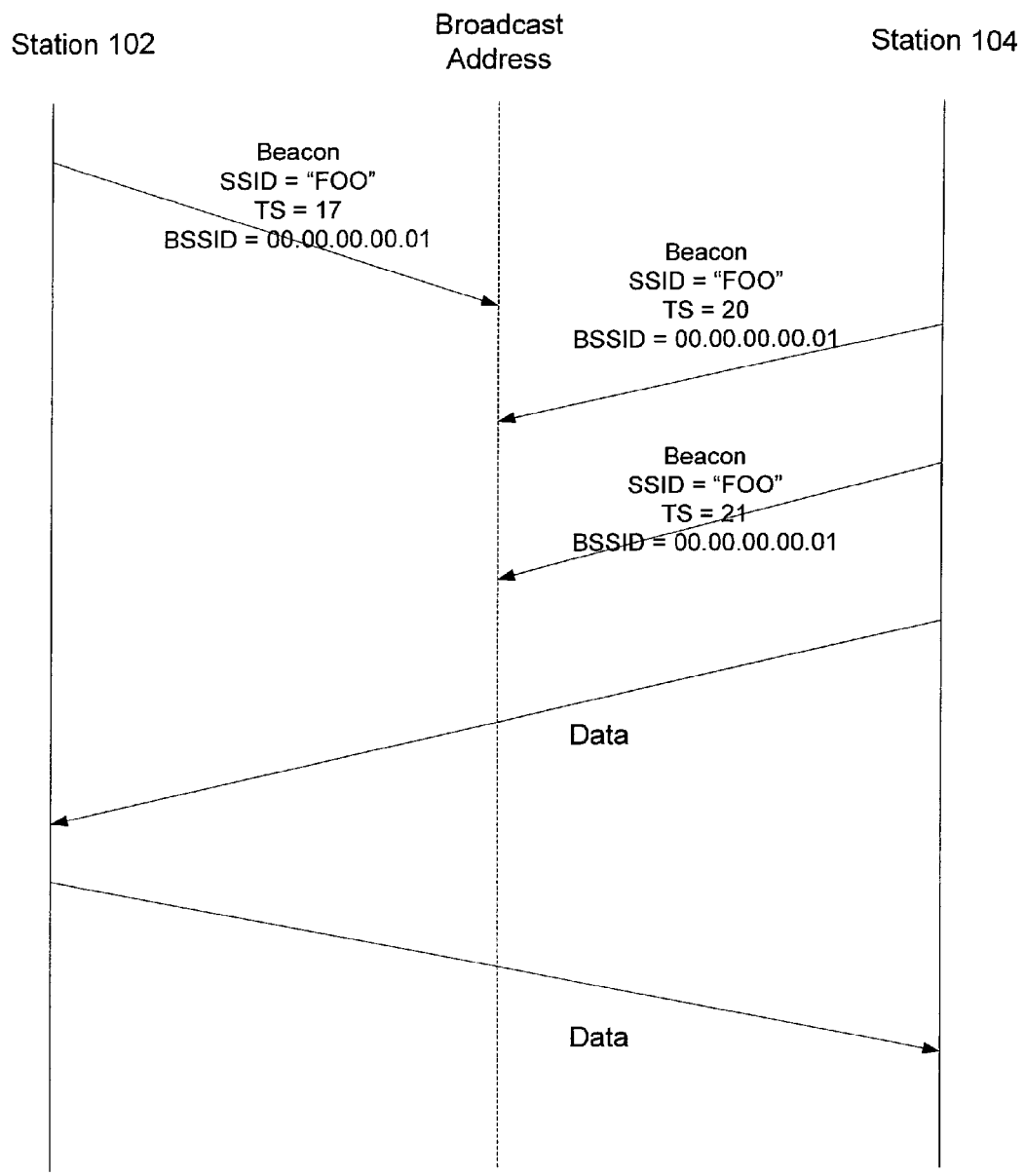
FIG. 2 is a packet flow diagram illustrating an example of an initialization process for setting up an ad hoc network between stations 102 and 104 of FIG. 1A.

FIG. 2 is a packet flow diagram illustrating an example of an initialization process for setting up an ad hoc network between stations 102 and 104 of FIG. 1A. In this example, a user begins the setup by configuring an ad hoc network, assigning it an SSID that is an alphanumeric network name. In this example, the SSID is chosen to be "foo". Users of various stations in the vicinity can join the ad hoc network by setting their stations to listen for packets that include the same SSID and that are sent by other stations. If no packet is detected, station 102 sends a beacon frame to announce the existence of the ad hoc network so that other stations may join. The beacon frame is a packet that includes the SSID and a randomly chosen Basic Service Set Identifier (BSSID). Here, the BSSID is a network address. The beacon frame also includes a timestamp indicating the local time of the station sending the beacon. As used herein, the station sending the beacon is referred to as a beacon master.

When station 104 receives the beacon, it compares the timestamp of the beacon with its own local timer. If the station's local timer is behind the beacon's timestamp, it will update its timer using the timestamp from the beacon. If, however, as it is the case in this example, station 104's local timer is ahead of the beacon's timestamp, station 104 will become the beacon master and start sending beacons. Station 102 will stop sending beacons because the new beacons sent by 104 will have a more advanced timestamp. Station 104, therefore, becomes the beacon master and continues to send beacon frames having the same SSID and BSSID. The two stations can exchange data by sending unicast packets to each other, specifying the same BSSID network address.

Figure 3:
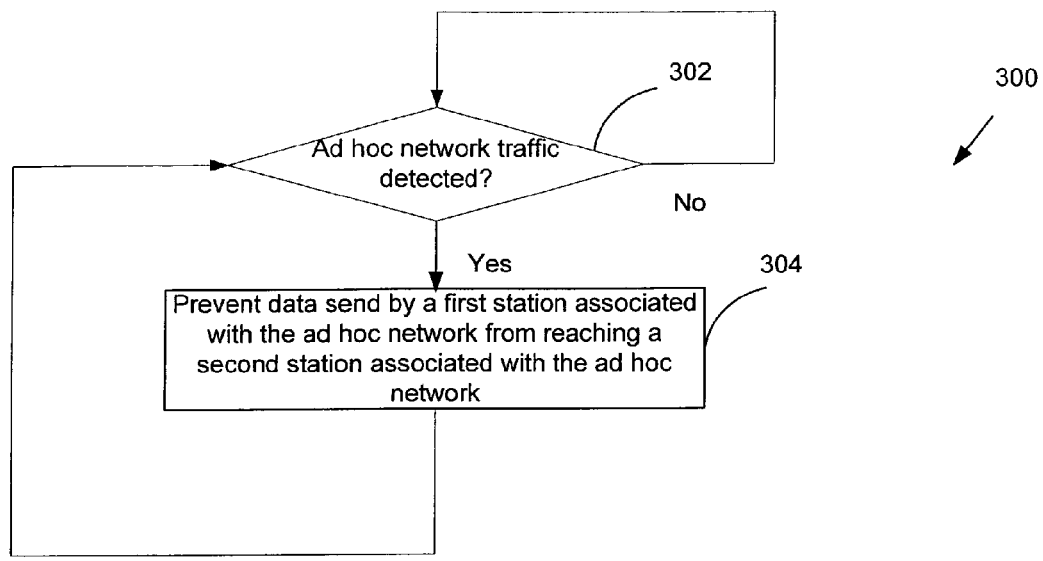
FIG. 3 is a flowchart illustrating an embodiment of a process for providing network security.

In FIG. 1B, network security system 106 becomes active and detects the ad hoc network. The network security system will intervene, and disrupt or disable the ad hoc network to protect the overall network. FIG. 3 is a flowchart illustrating an embodiment of a process for providing network security. The process may be implemented by a network security system such as 106. In this example, process 300 starts by detecting traffic associated with an ad hoc network (302). The detection is accomplished in some embodiments by monitoring data packets and management frames such as beacon frames. When ad hoc network related traffic is detected, to achieve security protection, data packets sent from a first station in the ad hoc network is prevented from reaching a second station in the network (304). The process continues to monitor packets to detect ad hoc network related traffic sent by stations and repeats.

Figure 4:
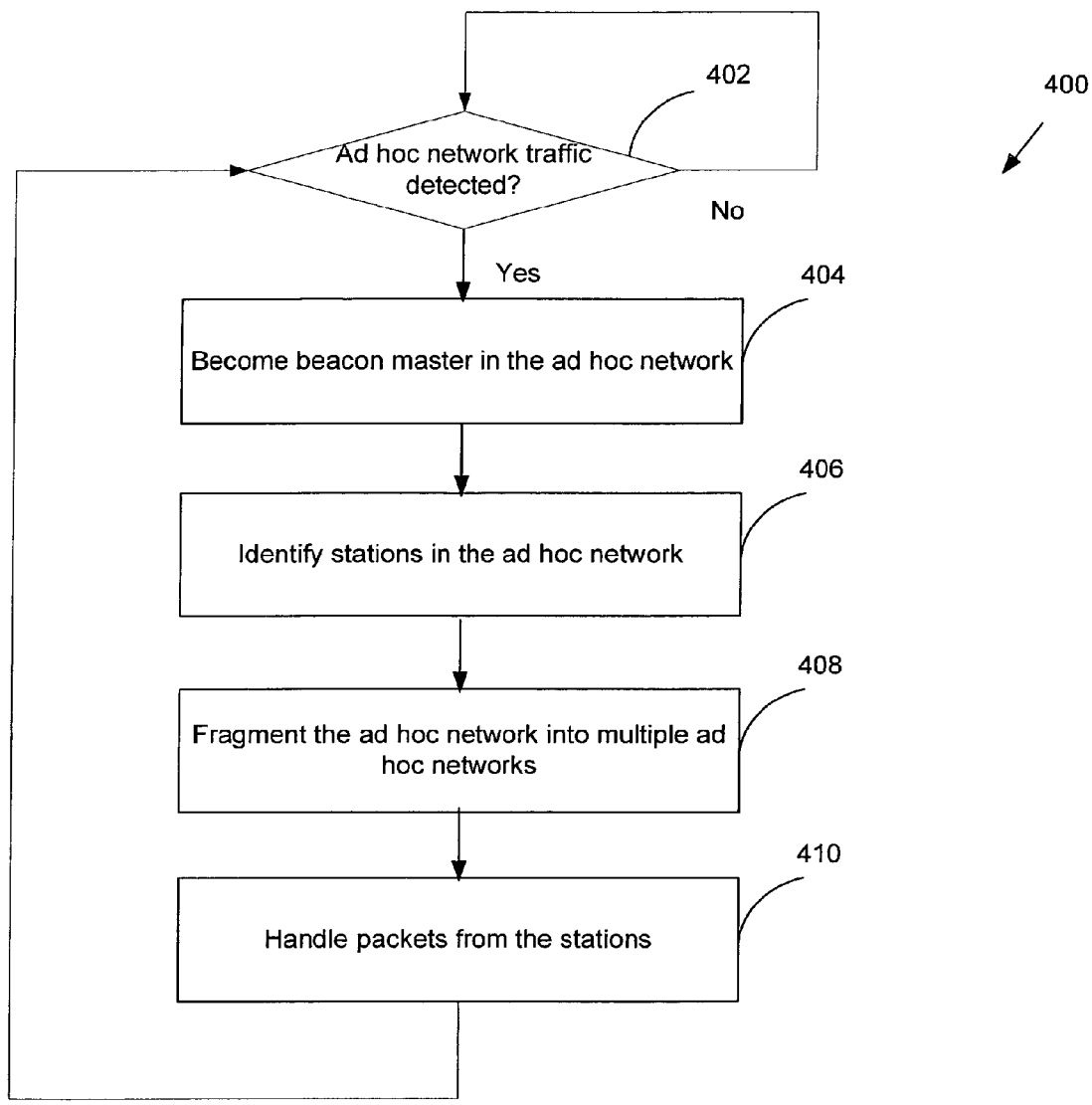
FIG. 4 is a flowchart illustrating an embodiment of a process for preventing one station from communicating with another station.

A number of techniques are used in various embodiments to prevent data packets sent from one station from reaching another station. FIG. 4 is a flowchart illustrating an embodiment of a process for preventing one station from communicating with another station. The process may be implemented by a network security system such as system 106 of FIG. 1B. In this example, decoy information is sent to the stations to configure them to be on separate networks.

Process 400 begins by detecting ad hoc network traffic (402). The process continuously monitors network traffic until traffic associated with an ad hoc network is detected. In the example shown, the traffic of interest includes beacon frames. The network security system will try to become the beacon master in the ad hoc network (404). In some embodiments, decoy information is sent to other stations for securing the beacon master status. One type of decoy information includes decoy beacon frames. As previously discussed, by convention, a station that is sending beacon frames with the most advanced timestamps becomes the beacon master of the ad hoc network. Therefore, to become the beacon master, the network security system sends decoy beacon frames with timestamps ahead of the local timers of all the other stations on the ad hoc network. In some embodiments, the network security system compares its local timer with the timestamp of every detected beacon frame. If the latter is ahead of the former, the network security system adjusts its local timer to be ahead of the detected timestamp and sends out a beacon frame based on the updated local timer. The network security system optionally runs its local timer at a faster speed than the other stations on the ad hoc network, so its local timer will always be ahead of the other stations, allowing the network security system to maintain its beacon master status.

In process 400, the process identifies the stations in the ad hoc network (406). The stations are identified based on the source and destination address information in the packet headers. Each unique source or destination address that is not a broadcast address corresponds to a station. Based at least in part on the station information, process 400 fragments the ad hoc network into multiple ad hoc networks (408). The security system operator can configure the fragmented network in many ways. For example, the fragmentation can put each station on a separate network so that the station cannot communicate with other stations. In some embodiments, the fragmentation puts several stations on one network and at least one other station on another network, so that stations within the same network can communicate with each other but not with stations on other networks. In this example, the process fragments the ad hoc network by sending a decoy beacon to each station in the ad hoc network. Instead of the broadcast address, the decoy beacon's destination address is the network address of the specific station. The decoy beacon has the same SSID as the ad hoc network, but has a different BSSID that corresponds to the newly assigned, fragmented ad hoc network to which the station ought to belong. It also has the most advanced timestamp that is ahead of the other stations. The decoy beacon induces the receiving station to send data to a fragmented ad hoc network chosen by the security device, thereby preventing the station from sending data to other stations in the original ad hoc network.

The packets sent by the stations are handled appropriately (410). In some embodiments, the packets are dropped to prevent further data communication. Log and/or alarm information may be generated as appropriate. In some embodiments, the process further monitors the packets sent by each station to determine whether they match the expected BSSID assigned by the security system. If not, another decoy beacon with a BSSID chosen by the security system is sent to the station. The process continues to monitor broadcast beacons sent by the stations (402) and repeats if traffic from unauthorized ad hoc networks is detected.

Figure 5:
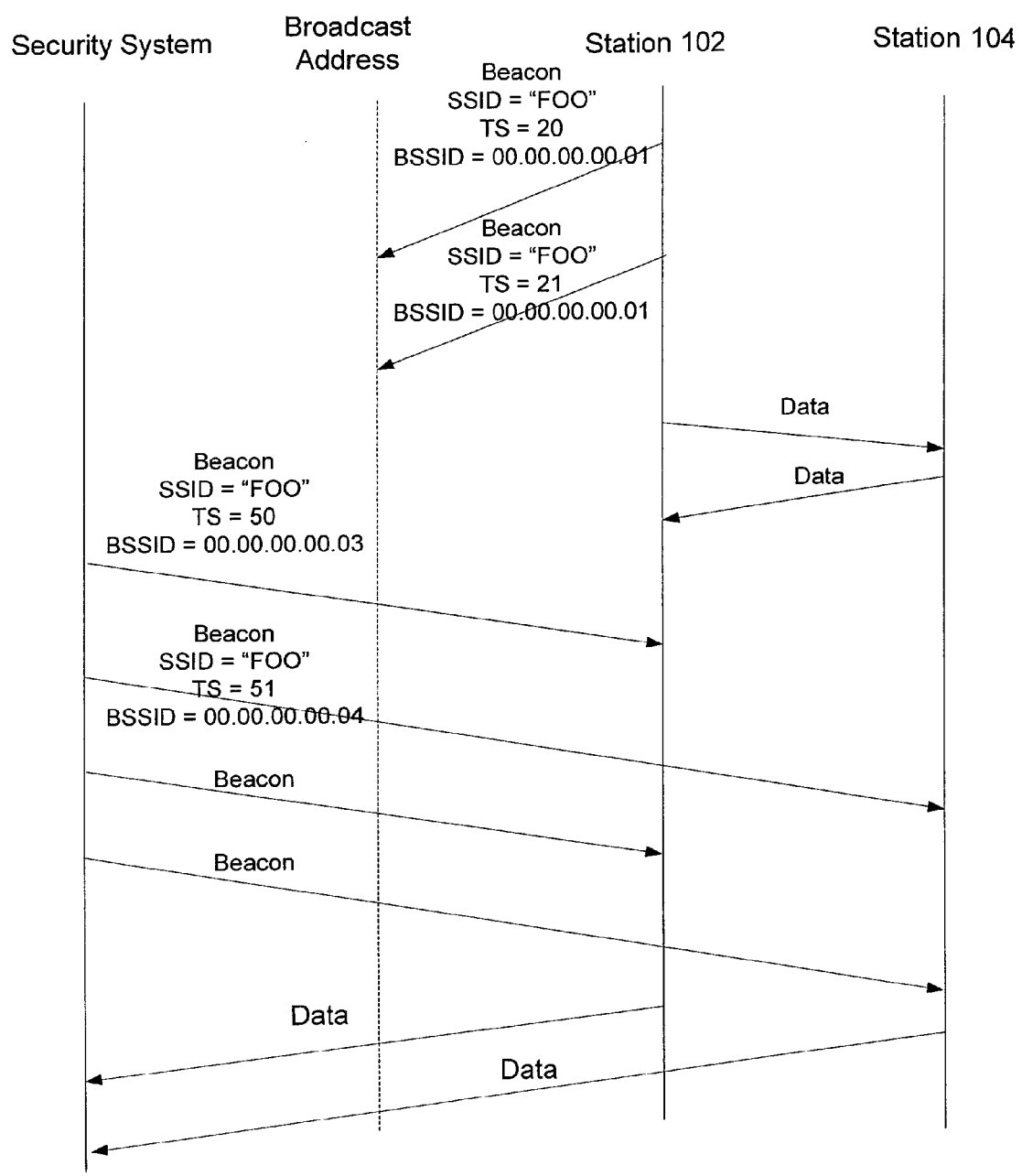
FIG. 5 is a packet flow diagram illustrating an example of a process for preventing two stations 102 and 104 of FIG. 1 from communicating with each other.

FIG. 5 is a packet flow diagram illustrating an example of a process for preventing two stations 102 and 104 of FIG. 1 from communicating with each other. In this example, the SSID for the initial ad hoc network is chosen as "foo". Station 102 acts as the beacon master, sending beacon frames to a BSSID of 00.00.00.00.01. Stations 102 and 104 exchange data over this ad hoc network, using the broadcast address. When the security system is enabled, it detects the ad hoc network, and identifies the stations' network addresses. The security system becomes the beacon master by adjusting its local timer to give generate beacon frames with the most advanced timestamps. It fragments the original ad hoc network into two fragmented networks, one for station 102 and one for station 104. To do so, the security system sends decoy beacon frames with an SSID of "foo" and a BSSID of 00.00.00.00.03 to the network address of station 102, and beacon frames with the same SSID but a BSSID of 00.00.00.00.04 to station 104. Since the security system is the only device not filtering by BSSID, packets sent by a station reaches only the security system and not the other stations.

The examples above mainly discuss the use of beacon frames as the decoy information. Other types of decoy information may be used. For example, some stations are configured to probe the network when it receives a beacon frame that includes an unexpected BSSID, such as the decoy beacon frame sent by the security system. Left unchecked, the probe message will cause other stations to respond and become visible to the probing station. To prevent this from happening, some security systems are configured to detect probe response packets and send decoy packets that are similar to the response packets. In some embodiments, a decoy packet generated by the security system in this situation includes the responding station's address in the header field so that it will appear to be coming from the responding station. Instead of the BSSID given by the responding station, the decoy packet includes the BSSID chosen by the security system. According to the IEEE 802.11 standard, when multiple copies of a packet are received, the receiving station accepts the last of the packets and discards the others. Thus, the receiving station (i.e., the probing station) will accept the decoy packet sent by the security device, and again be induced to send data packets to the decoy network address that corresponds to the BSSID chosen by the security device.

In some embodiments, the decoy information includes higher layer data such as TCP layer or application layer data, such as TCP control information or incorrect data. In one example, when ad hoc network traffic is detected, the security system sends decoy information that includes a TCP connection reset packet. The reset packet will cause the TCP connection to be terminated, thereby disabling data transfer on the ad hoc network. hi another example, the decoy information includes incorrect TCP data.

In some embodiments, channel information is included in the decoy information to prevent inter-station communication. By inducing a station to send data on an incorrect frequency channel, the ad hoc network is effectively disabled. In some embodiments, supported data rate, encryption information (including encryption key and/or whether encryption was enabled), capability information, as well as fake de-authentication or dissociation packets may be used. In some embodiments, the decoy information includes beacon frames that include a different BSSID but does not have an updated timestamp.

Providing network security has been disclosed. The technique detects and disables ad hoc networks without requiring direct control over the stations involved in the ad hoc networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing network security, comprising:
   detecting network traffic associated with a network, the network including a first station and a second station; and
   preventing data sent by the first station from reaching the second station by fragmenting the network so that the first station is on a first wireless network and the second station is on a second wireless network different than the first wireless network.

2. The method as recited in claim 1, wherein preventing data sent by the first station from reaching the second station includes sending decoy information to the first station.

3. The method as recited in claim 2, wherein the decoy information includes a Service Set Identifier (SSID) being the same SSID as the network and a Basic Service Set Identifier (BSSID) assigned to the first wireless network that is different from the BSSID of the network.

4. The method as recited in claim 3, wherein preventing data sent by the first station from reaching the second station further includes sending decoy information to the second station.

5. The method as recited in claim 4, wherein the decoy information to the second station includes a Service Set Identifier (SSID) being the same SSID as the network and a Basic Service Set Identifier (BSSID) assigned to the second wireless network that is different from the BSSID of the network.

6. The method as recited in claim 5, wherein the BSSID assigned to the first wireless network differs from the BSSID assigned to the second wireless network.

7. The method as recited in claim 2, wherein the decoy information includes a beacon.

8. The method as recited in claim 7, wherein the beacon is at least one frame including a timestamp set to a time ahead of current times of local timers in the first station and the second station.

9. The method as recited in claim 2, wherein the decoy information includes a probe response packet.

10. The method as recited in claim 2, wherein the decoy information includes Transmission Control Protocol (TCP) information.

11. The method as recited in claim 2, wherein the decoy information includes Internet Protocol (IP) information.

12. The method as recited in claim 1, wherein the network is an ad hoc network.

13. A method comprising:
    detecting probe response packets associated with a network, the network including a first station and a second station; and
    preventing data sent by the first station from reaching the second station by sending decoy packets corresponding to probe response packets, wherein a decoy packet to the first station includes a Basic Service Set Identifier (BSSID) of a first wireless network different from a BSSID of the network and a decoy packet to the second station includes a Basic Service Set Identifier (BSSID) of a second wireless network that is different from the BSSID of the network and the BSSID of the first wireless network.

14. The method as recited in claim 13, wherein the network is an ad hoc network.

15. The method as recited in claim 13, wherein the decoy packet comprises a timestamp set to a time ahead of current times of local timers in the first station and the second station.

16. A network security system comprising:
    a local timer;
    means for receiving wireless information;
    means for determining whether the wireless information is wireless traffic associated with an ad hoc network; and
    means for sending decoy information that places a source of the wireless information on a first wireless network and a destination for the wireless information on a second wireless network different than the first wireless network thereby preventing the wireless information from being directly transmitted between the source and the destination.

17. The network security system as recited in claim 16, wherein the decoy information includes a timestamp that identifies a current time maintained by the local timer that remains ahead of timing for local timers at the source and at the destination.

18. The network security system as recited in claim 17, wherein the decoy information is at least one beacon frame.

19. The network security system as recited in claim 18, wherein the at least one beacon frame includes a destination being a network address of the source information, a Service Set Identifier (SSID) being the same SSID as a network including the source and the destination and a Basic Service Set Identifier (BSSID) assigned to the first wireless network that is different from the BSSID of the network.

20. The network security system as recited in claim 17, wherein the decoy information is a probe response packet.

* * * * *